US012769023B2

(12) United States Patent
Altayyar et al.

(10) Patent No.: US 12,769,023 B2
(45) Date of Patent: Oct. 20, 2026

(54) METHODS AND SYSTEMS RELATING TO ESTIMATING A GAS MOBILITY RATIO

(71) Applicant: SAUDI ARABIAN OIL COMPANY, Dhahran (SA)

(72) Inventors: Tayyar S. Altayyar, Riyadh RUH (SA); Baqer M. Albensaad, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 488 days.

(21) Appl. No.: 18/298,125

(22) Filed: Apr. 10, 2023

(65) Prior Publication Data

US 2024/0337770 A1 Oct. 10, 2024

(51) Int. Cl.
*G01V 3/18* (2006.01)
*G01V 3/38* (2006.01)

(52) U.S. Cl.
CPC . *G01V 3/18* (2013.01); *G01V 3/38* (2013.01)

(58) Field of Classification Search
CPC .................................... G01V 3/18; G01V 3/38
See application file for complete search history.

(56) References Cited

U.S. PATENT DOCUMENTS 4,473,800 A * 9/1984 Warner .................... G01V 3/38 324/350
7,356,413 B2 * 4/2008 Georgi ................. G01N 24/081 702/11
7,893,692 B2 * 2/2011 Minh ....................... G01V 3/32 324/303
2010/0294493 A1 * 11/2010 Goodwin .............. E21B 43/255 166/57
2014/0238670 A1 * 8/2014 Pop ......................... E21B 49/10 166/264
2014/0320126 A1 * 10/2014 Heaton .................. G01V 11/00 324/303

(Continued)

FOREIGN PATENT DOCUMENTS

CN 104343445 B * 7/2017
CN 111271057 A * 6/2020

OTHER PUBLICATIONS

Tiab et al. Formation Resistivity and Water Saturation. Year: 2016.*

(Continued)

*Primary Examiner* — Lina Cordero
*Assistant Examiner* — Lynda Dinh
(74) *Attorney, Agent, or Firm* — Vorys, Sater, Seymour and Pease LLP

(57) ABSTRACT

Methods and systems for evaluating zones of a formation for potential gas production levels may use a correlation between resistivity and gas mobility ratio to assess the potential gas production levels of zones of a formation. For example, a method may include the steps of: obtaining resistivity data for a plurality of zones along wellbore penetrating a subterranean formation; determining an estimated gas mobility ratio for at least some of the plurality of zones, the estimated gas mobility ratio being based on the resistivity data using a correlation between a resistivity and a gas mobility ratio; and performing a production operation on at least one of the plurality of zones where the estimated gas mobility ratio is greater than a minimum gas mobility ratio.

15 Claims, 2 Drawing Sheets

(56) References Cited

U.S. PATENT DOCUMENTS

| | | | | |
|---|---|---|---|---|
| 2015/0198018 | A1* | 7/2015 | Farajzadeh | C09K 8/584<br>166/309 |
| 2018/0283149 | A1* | 10/2018 | Vittoratos | E21B 43/20 |
| 2023/0237227 | A1* | 7/2023 | Thakur | E21B 43/20<br>703/10 |

OTHER PUBLICATIONS

Lee. Matering Mobility Ratio in EOR, Year: 2025.*

Abunnumah et al. Experimental Evaluation of the Mobility Profile of Enhanced Oil Recovery Gases. Year: 2011.*

* cited by examiner

METHODS AND SYSTEMS RELATING TO ESTIMATING A GAS MOBILITY RATIO

FIELD OF THE DISCLOSURE

The present disclosure relates generally to evaluating zones of a formation for potential gas production levels.

BACKGROUND OF THE DISCLOSURE

Formation heterogeneity (or lithographic heterogeneity) in both the vertical and horizontal directions may be caused by glaciation deposition that occurred as the formation was formed. This is especially the case in sandstone and other tight formations. Formation heterogeneity presents a challenge in estimating and calibrating relative permeability and water saturation curves, which are commonly used to evaluate the potential for a zone of a formation to have viable gas production levels. Therefore, traditional methods for identifying zones in the formation that have viable gas production levels can be unreliable in sandstone and other tight formations.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A nonlimiting example method of the present disclosure may comprise: obtaining resistivity data for a plurality of zones along wellbore penetrating a subterranean formation; determining an estimated gas mobility ratio for at least some of the plurality of zones, the estimated gas mobility ratio being based on the resistivity data using a correlation between a resistivity and a gas mobility ratio; and performing a production operation on at least one of the plurality of zones where the estimated gas mobility ratio is greater than a minimum gas mobility ratio.

A nonlimiting example machine-readable storage medium of the present disclosure may have stored thereon a computer program, the computer program comprising a routine of set instructions for causing the machine to perform the steps of: receiving resistivity data for a plurality of zones along wellbore penetrating a subterranean formation; determining an estimated gas mobility ratio for at least some of the plurality of zones, the estimated gas mobility ratio being based on the resistivity data using a correlation between a resistivity and a gas mobility ratio; and identifying (e.g., displaying or otherwise reporting) at least one of the plurality of zones where the estimated gas mobility ratio is greater than a minimum gas mobility ratio.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
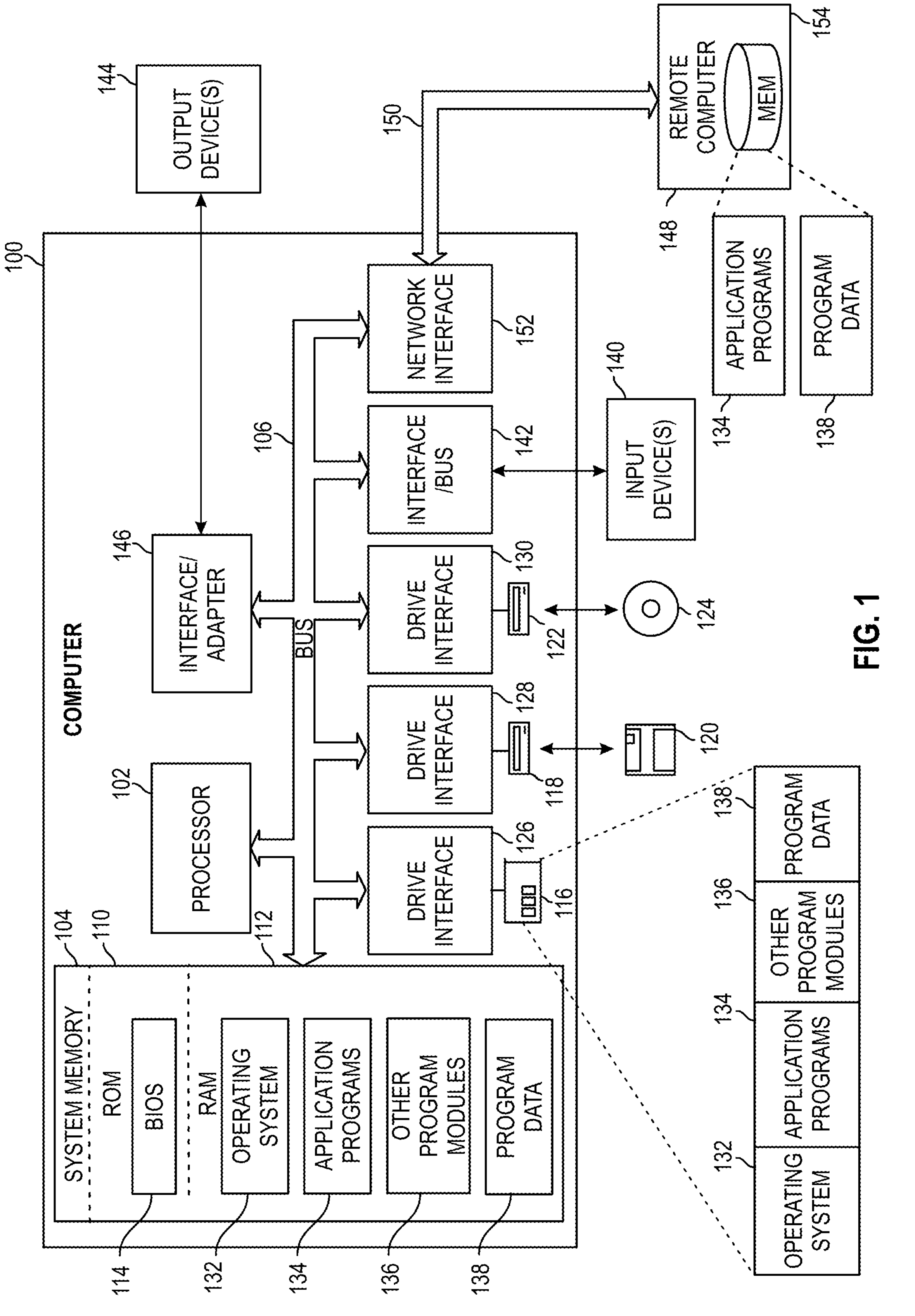
FIG. 1 illustrates one example of a computer system that can be employed to execute one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The present disclosure relates generally to evaluating zones of a formation for potential gas production levels. More specifically, the present disclosure uses a correlation between resistivity and gas mobility ratio to assess the potential gas production levels of zones of a formation.

A gas mobility ratio provides an indication of the rate and efficacy that fluids (e.g., hydrocarbons and water) to move through a porous medium and, consequently, provides an indication of the potential gas production level from said porous media. The gas mobility ratio (MgR) is calculated as the ratio of the mobility of gas to the mobility of water which is illustrated by the following equation;

$$MgR = \left(\frac{k_{eg}}{\mu_g}\right) / \left(\frac{k_{ew}}{\mu_w}\right),$$

where $k_{eg}$ is the endpoint relative permeability of the gas phase, $\mu_g$ is the viscosity of the gas phase, where $k_{ew}$ is the endpoint relative permeability of the water phase, and $\mu_w$ is the viscosity of the water phase. The relative permeability may be determined by known laboratory methods (preferably simulating reservoir conditions) and/or in-field measurements (e.g., wireline measurements). Examples of methods for determining relative permeability are described in U.S. Pat. Nos. 10,191,182, 11,492,895, and 11,525,345.

As described above, traditional measurements (e.g., relative permeability and water saturation curves) that indicate the potential gas production levels in traditional formation are not always suitable for formations with lithographic heterogeneity (e.g., shale formations, sandstone formations, and carbonate formations). As illustrated in the Examples below, a correlation can be derived between resistivity and gas mobility ratio in formations with lithographic heterogencity. Advantageously, said correlation may be used to identify zones that have viable gas production levels within a subterranean formation with lithographic heterogencity.

The correlation may be determined (or derived) using resistivity data measured at existing wellbores where production operations have occurred (e.g., as illustrated in the Examples).

Resistivity may indicate how strongly rock and/or fluid within the formation opposes the flow of electrical current. For example, resistivity may be indicative of the porosity of the formation and the presence of hydrocarbons. More specifically, resistivity may be relatively low for a formation that has high porosity and a large amount of water, and resistivity may be relatively high for a formation that has low porosity or includes a large amount of hydrocarbons.

Resistivity may be measured using wireline tools, measurement-while-drilling tools, logging-while-drilling tools, or a combination thereof.

The measured resistivity is in Ohm meter (Ohm·m). The measured resistivity may be an average resistivity over the zone that is correlated to the production level (or gas mobility ratio).

The correlation may be a mathematical function, table, or other mathematical representation that relates resistivity (measured as described above) (e.g., the average resistivity) and gas mobility ratio (determined using measured production levels as described above). For example, a plot of gas mobility ratio as a function of resistivity may be used as the basis of the correlation, where a trend line provides the correlation. Said trend line may be a mathematical function that include, but is not limited to, a linear function, an exponential function, a logarithmic function, a polynomial function, a power function, and the like.

The correlation should be determined (or derived) using a similar formation lithology. For example, a plurality of wells in a formation may be used to derive a correlation between resistivity and gas mobility ratio, and additional wells within the formation may use the correlation when determining exploration and/or production operations of the additional wells and specific zones around the additional wells. In another example, a first sandstone formation in a basin may be used to derive a correlation between resistivity and gas mobility ratio, and a second sandstone formation within the basin may use the correlation when determining exploration and/or production operations within the second sandstone formation.

In addition to the correlation, one or more gas mobility ratio thresholds may be determined that informs whether to proceed with exploration and/or production operations. For example, using the measured resistivity (e.g., the average resistivity) and gas mobility ratio (or known production) for existing zones, a minimum gas mobility ratio may be assigned as a threshold where new zones having a higher gas mobility ratio value may be prioritized for exploration and/or production operations. In another example, a series of thresholds for the gas mobility ratio (or levels of different gas mobility ratios) may be established to prioritize individual zones for exploration and/or production operations. The Examples illustrate a sandstone correlation derived from existing resistivity and gas production data where a threshold was determined as a minimum gas mobility ratio of 2.

When a new wellbore is drilled in a subterranean formation, resistivity measurements may be taken using, for example, wireline tools, measurement-while-drilling tools, logging-while-drilling tools, or a combination thereof. The correlation between resistivity and gas mobility ratio may then be used to determine an estimated gas mobility ratio for some or all of the zones using the resulting resistivity data (e.g., the measured resistivity data or a derivation thereof like the average resistivity for zones within the formation). If the estimated gas mobility ratio compared to a threshold gas mobility ratio indicates viable gas production levels for a zone, then an exploration operation and/or a production operation may be performed on the zone (or zone of interest).

An exploration operation may include drilling a new wellbore that intersects the zone of interest. This may, for example, occur when the zone of interest is far enough from the existing wellbore where a production operation is not as feasible and/or economical compared to a new wellbore. Further, a new wellbore may be drilled when a plurality of zones of interest can be intersected (or accessed) more readily than from the existing wellbore.

Production operations may include, but are not limited to, fracturing operations, acidizing operations, water or gas flood operations, the like, and any combination thereof.

The wellbores for either the existing wellbores used for determining the correlation, the wellbores where new resistivity measurements are taken for use in conjunction with the correlation, new wellbores drilled in response to the analysis of the correlation relative to the new resistivity measurements, or any combination thereof may be wellbores with vertical portions, high angle portions, horizontal portions, or a combination thereof. However, in general, formations with lithographic heterogeneity (e.g., shale formations, sandstone formations, and carbonate formations) are largely impermeable and utilizing horizontal drilling techniques to access more of the formation and increase the amount of hydrocarbon production per wellbore. Accordingly, horizontal wells may be preferable where hydraulic fracturing can occur in many stages using a hydraulic fracturing technique known as multistage hydraulic fracturing where individual states of the multistage hydraulic fracturing may be concentrated at or near zones of interest determined using correlations described herein. For example, a method may include, obtaining resistivity data (e.g., measured resistivity values or an average resistivity) for a plurality of zones along a horizontal wellbore penetrating a subterranean formation; determining an estimated gas mobility ratio for at least some of the plurality of zones, the estimated gas mobility ratio being based on the resistivity data using a correlation between a resistivity and a gas mobility ratio; and performing a hydraulic fracturing operation on at least one of the plurality of zones where the estimated gas mobility ratio is greater than a minimum gas mobility ratio. Said hydraulic fracturing operation may include pumping a fracturing fluid into the at least one of the plurality of zones at a rate and pressure sufficient to create and/or extend one or more fractures in the at least one of the plurality of zones.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 1. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In this regard, FIG. 1 illustrates one example of a computer system 100 that can be employed to execute one or more embodiments of the present disclosure. Computer system 100 can be implemented on one or more general purpose networked computer systems, embedded computer systems, routers, switches, server devices, client devices, various intermediate devices/nodes or standalone computer systems. Additionally, computer system 100 can be implemented on various mobile clients such as, for example, a personal digital assistant (PDA), laptop computer, pager, and the like, provided it includes sufficient processing capabilities.

Computer system 100 includes processing unit 102, system memory 104, and system bus 106 that couples various system components, including the system memory 104, to processing unit 102. Dual microprocessors and other multi-processor architectures also can be used as processing unit 102. System bus 106 may be any of several types of bus structure including a memory bus or memory controller, a peripheral bus, and a local bus using any of a variety of bus architectures. System memory 104 includes read only memory (ROM) 110 and random access memory (RAM) 112. A basic input/output system (BIOS) 114 can reside in ROM 110 containing the basic routines that help to transfer information among elements within computer system 100.

Computer system 100 can include a hard disk drive 116, magnetic disk drive 118, e.g., to read from or write to removable disk 120, and an optical disk drive 122, e.g., for reading CD-ROM disk 124 or to read from or write to other optical media. Hard disk drive 116, magnetic disk drive 118, and optical disk drive 122 are connected to system bus 106 by a hard disk drive interface 126, a magnetic disk drive interface 128, and an optical drive interface 130, respectively. The drives and associated computer-readable media provide nonvolatile storage of data, data structures, and computer-executable instructions for computer system 100. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 110, including operating system 132, one or more application programs 134, other program modules 136, and program data 138. In some examples, the application programs 134 can include modules for deriving a trend line or other mathematical representation of the correlation and the program data 138 can include the correlation, a threshold related to the correlation, the estimated gas mobility ratio, and other derived values relative to the methods and systems described herein. The application programs 134 and program data 138 can include functions and methods programmed to identify zones of a formation that have potentially viable gas production levels, such as shown and described herein, to provide (e.g., display or otherwise report) parameters for performing a production operation on a zone having potentially viable gas production levels, or cause a system to perform at least a portion of a production operation on a zone having potentially viable gas production levels.

A user may enter commands and information into computer system 100 through one or more input devices 140, such as a pointing device (e.g., a mouse, touch screen), keyboard, microphone, joystick, game pad, scanner, and the like. These and other input devices 140 are often connected to processing unit 102 through a corresponding port interface 142 that is coupled to the system bus, but may be connected by other interfaces, such as a parallel port, serial port, or universal serial bus (USB). One or more output devices 144 (e.g., display, a monitor, printer, projector, or other type of displaying device) is also connected to system bus 106 via interface 146, such as a video adapter.

Computer system 100 may operate in a networked environment using logical connections to one or more remote computers, such as remote computer 148. Remote computer 148 may be a workstation, computer system, router, peer device, or other common network node, and typically includes many or all the elements described relative to computer system 100. The logical connections, schematically indicated at 150, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 100 can be connected to the local network through a network interface or adapter 152. When used in a WAN networking environment, computer system 100 can include a modem, or can be connected to a communications server on the LAN. The modem, which may be internal or external, can be connected to system bus 106 via an appropriate port interface. In a networked environment, application programs 134 or program data 138 depicted relative to computer system 100, or portions thereof, may be stored in a remote memory storage device 154.

EXAMPLES

Figure 2:
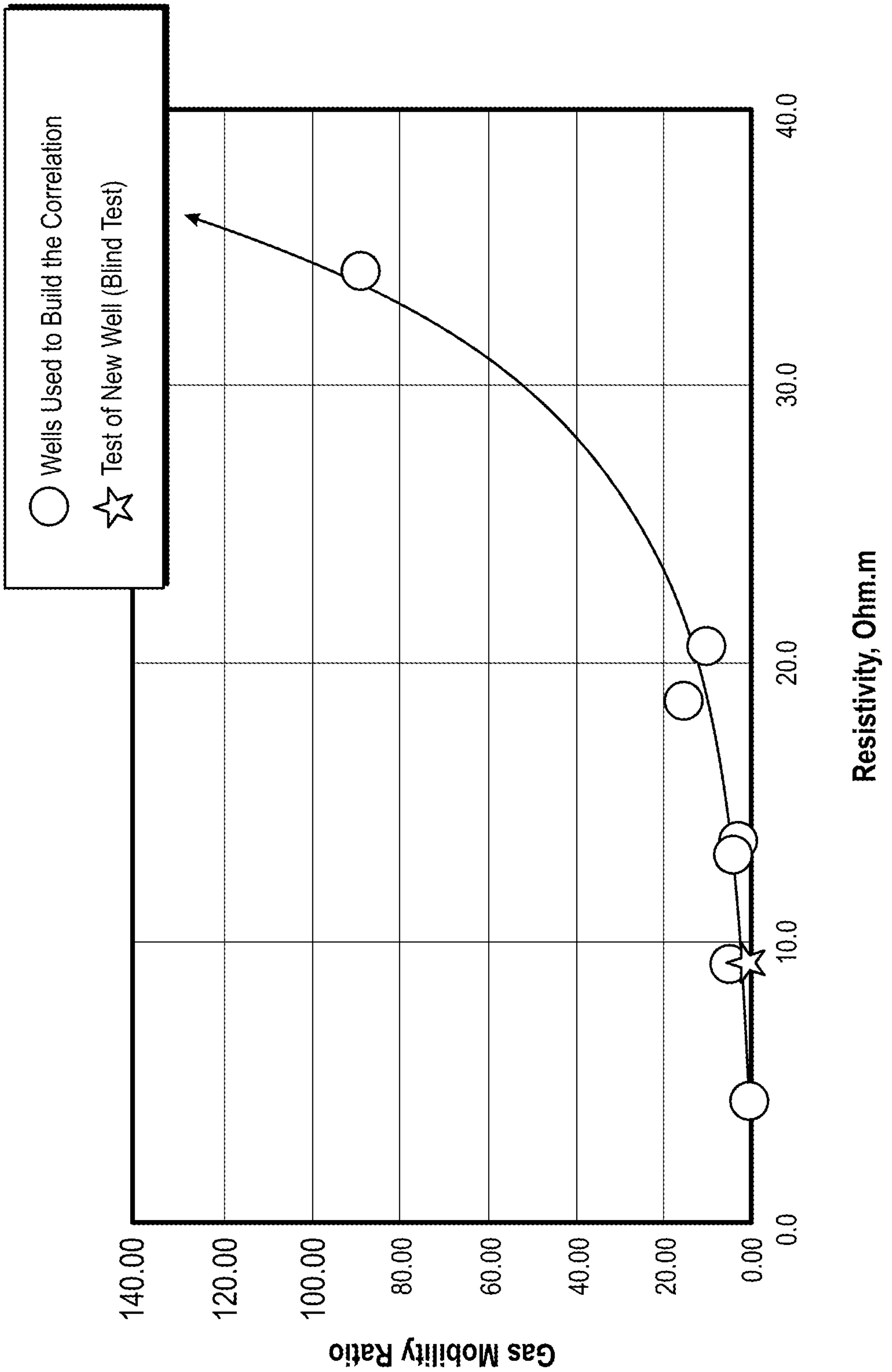
FIG. 2 illustrates a plot of gas mobility ratio as a function of average resistivity (in Ohm·meter) for a plurality of zones in a sandstone subterranean formation.

FIG. 2 illustrates a plot of gas mobility ratio as a function of average resistivity (in Ohm·m) for a plurality of zones in a sandstone subterranean formation across the studied area of interest (field) where exploration and production operations had occurred. The average resistivity for the various zones was calculated based on the resistivity log data for said zones. The gas mobility ratio was calculated based on the performance of the zones. An exponential correlation ($y=0.6312e^{0.1479x}$, with an $R^2$ of 0.905) was derived from the plot.

Average resistivity for a new zone was calculated. Using the exponential correlation derived from the FIG. 2 plot. The new zone had an estimated gas mobility ratio of 2.5. The actual gas mobility ratio for the zone was 2.8, which is 90% accurate compared to the estimated gas mobility ratio.

EXAMPLE EMBODIMENTS

Embodiment 1. A method comprising: obtaining resistivity data for a plurality of zones along wellbore penetrating a subterranean formation; determining an estimated gas mobility ratio for at least some of the plurality of zones, the estimated gas mobility ratio being based on the resistivity data using a correlation between a resistivity and a gas mobility ratio; and performing a production operation on at least one of the plurality of zones where the estimated gas mobility ratio is greater than a minimum gas mobility ratio.

Embodiment 2. The method of Embodiment 1, wherein the resistivity data for the plurality of zones is an average resistivity value for the zone.

Embodiment 3. The method of one of Embodiments 1-2, wherein the correlation is an exponential function.

Embodiment 4. The method of one of Embodiments 1-3, wherein the subterranean formation comprises a shale, a tight sand, or a tight carbonate.

Embodiment 5. The method of one of Embodiments 1-4, wherein the wellbore includes a horizontal portion.

Embodiment 6. The method of one of Embodiments 1-5 further comprising: drilling the wellbore; and wherein the obtaining of the resistivity data comprises measuring resistivity values for the plurality of zones using a measurement-while-drilling tool or logging-while-drilling tool while drilling the wellbore.

Embodiment 7. The method of one of Embodiments 1-6, wherein the obtaining of the resistivity data comprises measuring resistivity values for the plurality of zones and deriving an average resistivity for the at least some of the zones.

Embodiment 8. The method of one of Embodiments 1-7, wherein the minimum gas mobility ratio is 2.

Embodiment 9. The method of one of Embodiments 1-7, wherein the minimum gas mobility ratio is 2.5.

Embodiment 10. A machine-readable storage medium having stored thereon a computer program, the computer program comprising a routine of set instructions for causing the machine to perform the steps of: receiving resistivity data for a plurality of zones along wellbore penetrating a subterranean formation; determining an estimated gas mobility ratio for at least some of the plurality of zones, the estimated gas mobility ratio being based on the resistivity data using a correlation between a resistivity and a gas mobility ratio; and identifying (e.g., displaying or otherwise reporting) at least one of the plurality of zones where the estimated gas mobility ratio is greater than a minimum gas mobility ratio.

Embodiment 11. The machine-readable storage medium of Embodiment 10, the steps further include: displaying parameters for performing a production operation on the at least one of the plurality of zones where the estimated gas mobility ratio is greater than the minimum gas mobility ratio.

Embodiment 12. The machine-readable storage medium of one of Embodiments 10-11, the steps further include: causing a system to perform at least a portion of a production operation on the at least one of the plurality of zones where the estimated gas mobility ratio is greater than the minimum gas mobility ratio.

Embodiment 13. The machine-readable storage medium of one of Embodiments 10-12, wherein the resistivity data for the plurality of zones is an average resistivity value for the zone.

Embodiment 14. The machine-readable storage medium of one of Embodiments 10-13, wherein the correlation is an exponential function.

Embodiment 15. The machine-readable storage medium of one of Embodiments 10-14, wherein the subterranean formation comprises a shale, a tight sand, or a tight carbonate.

Embodiment 16. The machine-readable storage medium of one of Embodiments 10-15, wherein the wellbore includes a horizontal portion.

Embodiment 17. The machine-readable storage medium of one of Embodiments 10-16, wherein the minimum gas mobility ratio is 2.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:

obtaining resistivity data for existing zones of a plurality of zones along a wellbore penetrating a subterranean formation having lithographic heterogeneity, wherein wellbore production operations have occurred at the existing zones, the resistivity data being obtained by measuring resistivity at the existing zones, and each of the existing zones has a production level represented as a gas mobility ratio;

determining a correlation between the resistivity data and gas mobility ratios of the existing zones;

determining a predetermined threshold for the plurality of zones, the predetermined threshold being a minimum gas mobility ratio;

measuring new resistivity of new zones of the plurality of zones to generate new resistivity data, the new zones including a first zone and a second zone;

estimating a first gas mobility ratio for the first zone and a second gas mobility ratio for the second zone based on the new resistivity data, wherein the estimated gas mobility ratios are determined using the correlation;

determining that the first gas mobility ratio is greater than the second gas mobility ratio and that the second gas mobility ratio is greater than the predetermined threshold; and performing a production operation on the first zone in response to determining that the first gas mobility ratio is greater than the second gas mobility ratio, wherein the production operation is drilling a new wellbore that intersects the first zone.

2. The method of claim 1, wherein the resistivity data for the existing zones comprises an average resistivity value for the existing zones and the minimum gas mobility ratio is correlated with gas-producing zones of the plurality of zones.

3. The method of claim 1, wherein the correlation is an exponential function.

4. The method of claim 1, wherein the subterranean formation comprises a shale, a tight sand, or a tight carbonate.

5. The method of claim 1, wherein the wellbore includes a horizontal portion.

6. The method of claim 1, wherein the resistivity data comprises measurements of resistivity values for the plurality of zones using a measurement-while-drilling tool or logging-while-drilling tool while drilling the wellbore.

7. The method of claim 1, wherein the resistivity data comprises measured resistivity values for the plurality of zones and an average resistivity value for some of the existing zones.

8. The method of claim 1, wherein the minimum gas mobility ratio is 2.

9. The method of claim 1, wherein the minimum gas mobility ratio is 2.5.

10. A non-transitory machine-readable storage medium having stored thereon a computer program, the computer program comprising a routine of set instructions for causing the machine to perform the steps of:

receiving resistivity data for a plurality of zones along a wellbore penetrating a subterranean formation having lithographic heterogeneity, wherein resistivity data is received in response to measurement of resistivity across subterranean formations corresponding to the plurality of zones, each of the plurality of zones having a production level represented as a gas mobility ratio;

determining an estimated gas mobility ratio for a given, first, and second zone each having respective resistivity data, the estimated gas mobility ratios being based on the resistivity data using a correlation between the resistivity data and the gas mobility ratios of the plurality of zones;

comparing the estimated gas mobility ratios of the first and second zones to determine which of the first and second zones has a greater estimated gas mobility ratio, wherein the greater estimated gas mobility ratio is a minimum gas mobility threshold;

determining that the given zone has a respective estimated gas mobility ratio greater than the minimum gas mobility threshold; and causing a production operation at the given zone in response to determining the respective estimated gas mobility ratio of the given zone is greater than the minimum gas mobility threshold, wherein the production operation is drilling a new wellbore that intersects the given zone.

11. The non-transitory machine-readable storage medium of claim 10, wherein the resistivity data for the plurality of zones comprises an average resistivity value.

12. The non-transitory machine-readable storage medium of claim 10, wherein the correlation is an exponential function.

13. The non-transitory machine-readable storage medium of claim 10, wherein the subterranean formation comprises a shale, a tight sand, or a tight carbonate.

14. The non-transitory machine-readable storage medium of claim 10, wherein the wellbore includes a horizontal portion.

15. The non-transitory machine-readable storage medium of claim 10, wherein the minimum gas mobility ratio is 2.

* * * * *